United States Patent
Brush, II et al.

[19]

[11] Patent Number: 5,884,029
[45] Date of Patent: Mar. 16, 1999

[54] USER INTERACTION WITH INTELLIGENT VIRTUAL OBJECTS, AVATARS, WHICH INTERACT WITH OTHER AVATARS CONTROLLED BY DIFFERENT USERS

[75] Inventors: Abbott Purdy Brush, II, Woodbridge, Conn.; Sarah D. Redpath, Cary, N.C.; David Bruce Lection; Donald Robert Wood, both of Raleigh, N.C.

[73] Assignee: International Business Machines Corporation, Armonk, N.Y.

[21] Appl. No.: 746,694

[22] Filed: Nov. 14, 1996

[51] Int. Cl.[6] .................................................. G06F 13/00
[52] U.S. Cl. ...................................... 395/200.32; 395/680
[58] Field of Search ............................... 395/200.32, 680

[56] References Cited

U.S. PATENT DOCUMENTS

| 5,649,186 | 7/1997 | Ferguson ............................... 707/10 |
| 5,706,516 | 1/1998 | Chang et al. ........................... 395/680 |
| 5,717,835 | 2/1998 | Hellerstein ............................ 706/46 |
| 5,727,950 | 3/1998 | Cook et al. ............................ 434/350 |
| 5,790,789 | 8/1998 | Suarez .................................. 395/200.32 |
| 5,799,298 | 8/1998 | Bingham et al. ...................... 707/1 |
| 5,802,296 | 9/1998 | Morse et al. .......................... 395/200.38 |

OTHER PUBLICATIONS

Oliveira et al.; Intelligent Agents: A Way to Reduce the Gap Between Applications and Networks; Factory Communication Systems, 1995; pp. 81–90.

Chen et al.; Toward Intelligent Meeting Agents; Computer Magazine; pp. 62–70, Aug. 1996.

*Primary Examiner*—Krisna Lim
*Assistant Examiner*—Kenneth R. Coulter
*Attorney, Agent, or Firm*—Jeanine S. Ray-Yarletts

[57] ABSTRACT

A method and apparatus wherein a user interacts with an intelligent virtual object, or avatar, wherein the user is able to program a personality into the intelligent virtual object. The programmed personality allows the intelligent virtual object to react to stimuli without the need to communicate each stimuli to the user. This optimizes the flow of traffic over the transmission medium.

18 Claims, 8 Drawing Sheets

USER INTERACTION WITH INTELLIGENT VIRTUAL OBJECTS, AVATARS, WHICH INTERACT WITH OTHER AVATARS CONTROLLED BY DIFFERENT USERS

FIELD OF THE INVENTION

The present invention is related to, but not limited to, the traversal of the Internet, also known as the world wide web. It specifically relates to the interaction of users of the world wide web using proxies or representations of the user in a simulated or virtual world.

RELATED APPLICATIONS

The present application is closely related to the copending application Ser. No. 08/746,695 entitled Communication Between Intelligent Virtual Objects filed herewith.

BACKGROUND OF THE INVENTION

In recent history, computers have become much more pervasive in society. In addition, they have become more powerful, faster and have significantly more storage than they did just a few short years ago. These exponential increases in speed, storage and processor power have provided the necessary infrastructure for computers to network together effectively.

The most publicized computer network in existence is referred to as the Internet. The Internet is a connection of computers using the TCP/IP protocol. This has evolved into what is now referred to as the world wide web which provides a somewhat cognitive interface into the Internet. The world wide web allows users to access information by indicating the location of the information which they desire to retrieve or by traversing hyper-text links which cross-reference information in many different locations. This is made possible by the implementation of a universal resource locator (url) as a way of locating information on the world wide web.

Many products have been developed which assist the user in searching the web for information. Access to the world wide web can be accomplished very inexpensively using a phone line, an inexpensive computer and a software program called a web browser such as Netscape's Navigator or IBM's Web Explorer. This ability to inexpensively connect into the world wide web has encouraged its use for much more than business purposes. The world wide web is used for educational research, shopping, games, making reservations, trading stock and numerous other purposes. Children, as well as adults, are frequent users of the world wide web.

While it was the advent of two dimensional graphically intense web sites that spurred the popularity of the Internet, the next level of technology may bring Internets, internal networks such as intranets, and networks in general to a new level. The intent of this phase of Internet development has been to render web sites sensually. That is, a user interacts with or exists within a site and experiences and perceives the site from within. This is referred to as Virtual Reality and is intended to perceptualize the network or to have the network rendered to humans with more of their senses. It puts the user in the center of the Internet.

While Virtual Reality is still in its infancy, it traditionally uses computer simulations containing three-dimensional (3D)graphics and devices to allow the user to interact with the simulation. Much of what the user has been able to browse as "data" on the web may be able to be 'experienced' as a 3D web site in the future. 3D web sites are constructed with a Virtual Reality Modeling Language, herein referred to as VRML, which allows for the design and implementation of platform-independent scene descriptions. VRML is a file format for describing interactive 3D objects and worlds to be experienced on the world wide web utilizing http (A Hyper-Text Transfer Protocol used on the Internet) in its implementation.

VRML allows an individual to construct three dimensional, viewable, representations of objects. These objects can then be placed on a web site, and viewed on the world wide web, by any user that has a VRML enabled browser installed on the user's computer. These objects can be any object the VRML author can imagine, such as: telephones, houses, cityscapes, or three dimensional representations of data, or even animals or human characters. Initially these objects were inanimate, but enhancements to VRML have been made to allow for animation of objects existing in a world, in addition to allowing for sensors to be used to trigger preprogrammed responses from the objects with which they interact. Still objects have not been able to independently act with the user.

In an effort to 'place the user into the center of the Internet', the concept of an intelligent virtual object, called an avatar, has come into being. An avatar is a representation of the user which is embodied as a character so that the user can traverse the web as a representative being. The avatar can be considered a proxy of the user, conducting business on the web for the user. Avatars can also contain computer programs to implement additional functions that the avatar perform. The avatar will appear to go from location to location, allowing the user to perceive, with the senses of sight and sound, the surroundings in the world in which the avatar is traversing. While this has been an extremely significant step in the development of traversing the world wide web, it is still only based on the concept of one person searching for and locating information using an avatar as the representation of the user.

SUMMARY OF THE INVENTION

The present invention incorporates the concept of multiple users, hence multiple avatars, in a virtual reality world on the world wide web. These multiple avatars can see each other and interact with each other. The current technology allows users to chat or exchange voice via an Internet telephony technology or by way of written formats. Other forms of communication such as facial expressions, body language and numerous other forms of communication are expected as the transmission capacity of the web increases and are the subject of the present invention.

A critical problem in the implementation of using avatars as proxies is the latency involved in transmitting information between the avatar and the user who is controlling the avatar. In a world that is meant to simulate the "real" world, the interaction of two avatars can be significantly impacted and become cumbersome if, prior to any Movement or action, the avatar collects information, sends the information across the network with its associated delays to the user, the user processes the information, then the user sends the response to the avatar across the network with the associated delays. This latency causes jerky and unnatural actions and reactions of the avatars.

The present invention solves this problem by utilizing the programablity of the avatars using a programming language supported by VRML browsers. This programming language gives the creator of the avatar the ability to pre-program responses to certain stimuli such that the avatar can act autonomously from the user while concurrently sending the stimulus and the preprogrammed response to the user for additional reaction and verification.

In specific, the present invention implements the notion of specific data transfer between multiple avatars. A more granular description of an avatar is helpful at this point. Avatars, as all other things which reside on the world wide web, consist of computer programming. This can be in the form of executable code, definitions, tables, or any other form of program code recognizable to the system on which it is running. Hence, an avatar is in reality programming. An avatar is capable of containing additional programming to extend its functionality. Functions such as a file transfer protocol for data between two avatars can be implemented. Data such as documents, electronic cash, names, addresses or any other data the user wishes to exchange may be transferred from one avatar to another using predefined transfer protocols.

The protocol used to communicate between avatars must be in a format accepted and understood by all of the avatars involved. Such a universally accepted format permits the avatars to effectively share information. The format chosen for the preferred embodiment is the Versit standard.

Avatars, as implemented in this invention, are a collection of programming that may be distributed across multiple servers and ultimately determined by an end user. An avatar carries with it characteristics that are defined for that particular avatar. Characteristics such as shape, color, preference, personality and, credit and financial history are held with the avatar and will be transmitted with the avatar from server to server as the avatar traverses the world wide web. This information determines the representation of the avatar in the worlds in which it enters. Other aspects of the avatar are associated with the avatar by having the url address of the file containing the programming or definition coded in, or carried with, the avatar. Such characteristics are implemented by preferring to the url in which this programming is kept. When the characteristic held in the url is needed, it is referenced by the avatar and the code is executed in the memory of the server in which the avatar currently resides. This allows the information which is actually transmitted with the avatar to be minimized while allowing additional characteristics which the avatar might use to be accessed on a timely and repeatable basis. Yet other characteristics of the avatar may be controlled by the user via programming or interactive responses. This will become clearer as it is described using the examples in the preferred embodiment.

DETAILED DESCRIPTION OF THE PREFERRED EMBODIMENT

The preferred embodiment of the present invention is implemented using VRML in a virtual world. An avatar is implemented to represent a user, or one or more aspects of a user, in the virtual world. Some of the standard protocols used to transfer data between the avatars are the formats defined by the Versit standards organization. Examples of these Versit formats are the vCard and vCalendar formats. The vCard format, for example, allows the users to share their names, addresses, phone number and other pertinent information. Additional information beyond that identified in the Versit standards are also capable of being transferred. In the preferred embodiment, information such as preferences are able to be transferred and "remembered" by the avatar. This becomes much more evident from a specific example.

Figure 1:
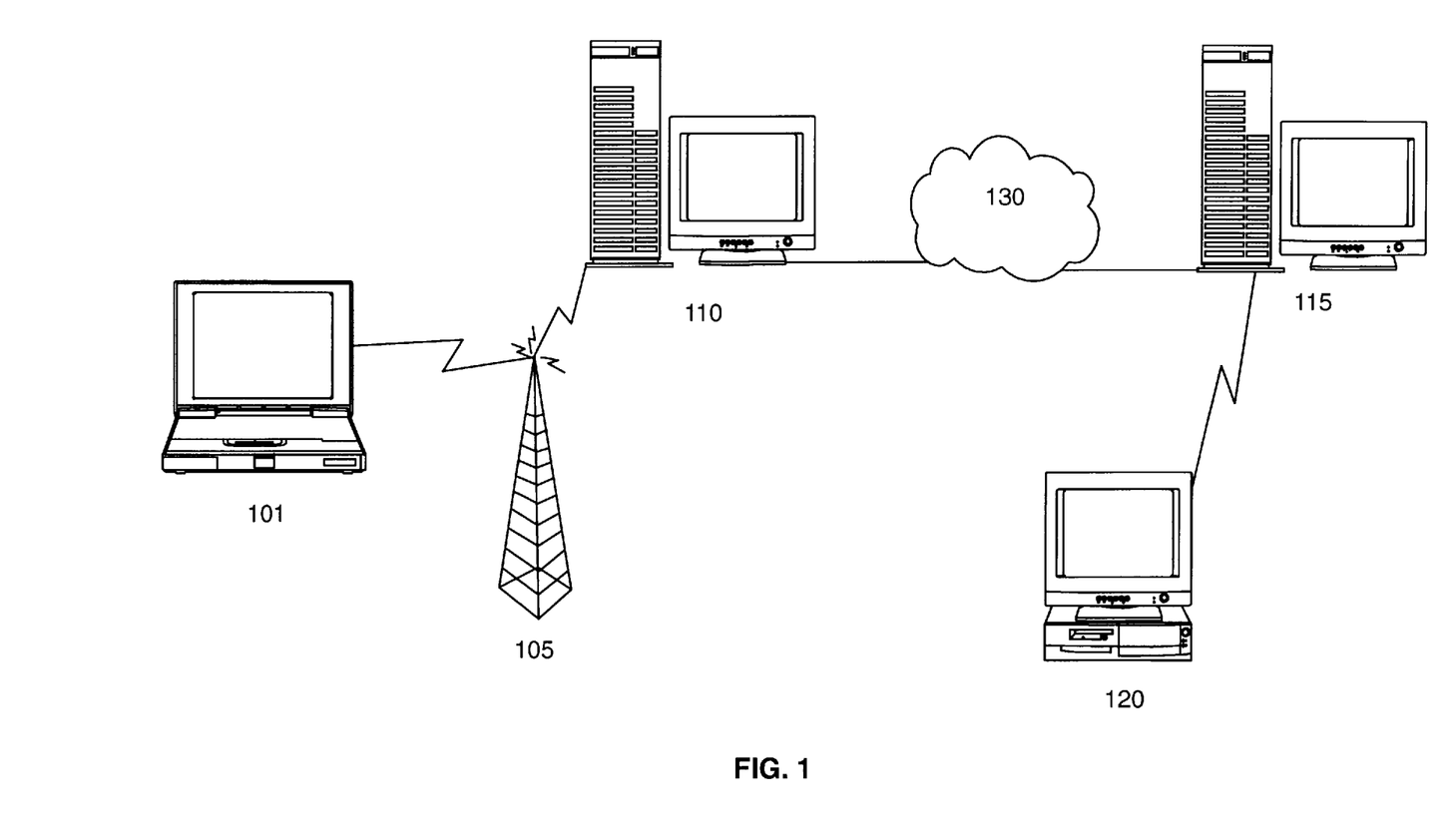
FIG. 1 depicts a sample network in which the present invention is implemented.

The example network that we will be using is that of FIG. 1. In our example, the computer labeled 115 is the server computer for the user residing on computer 120. The user (USER1) residing on computer 120 has created an avatar called AVATAR1. A second user is utilizing a notebook computer 101 to connect to a second server 110 over a wireless link. The second user (USER2) also has an avatar (AVATAR2). Both of the servers 110, 115 are connected into, and hence are part of, the world wide web as depicted by 130.

The virtual world of the preferred embodiment is a shopping mall, although a virtual world could be created to be any perceived world; both those mimicking our reality and those of science fiction. The virtual shopping mall contains many stores which, in the present implementation, physically reside on multiple servers within the Internet. An example of this is shown in FIG. 2.

Figure 2:
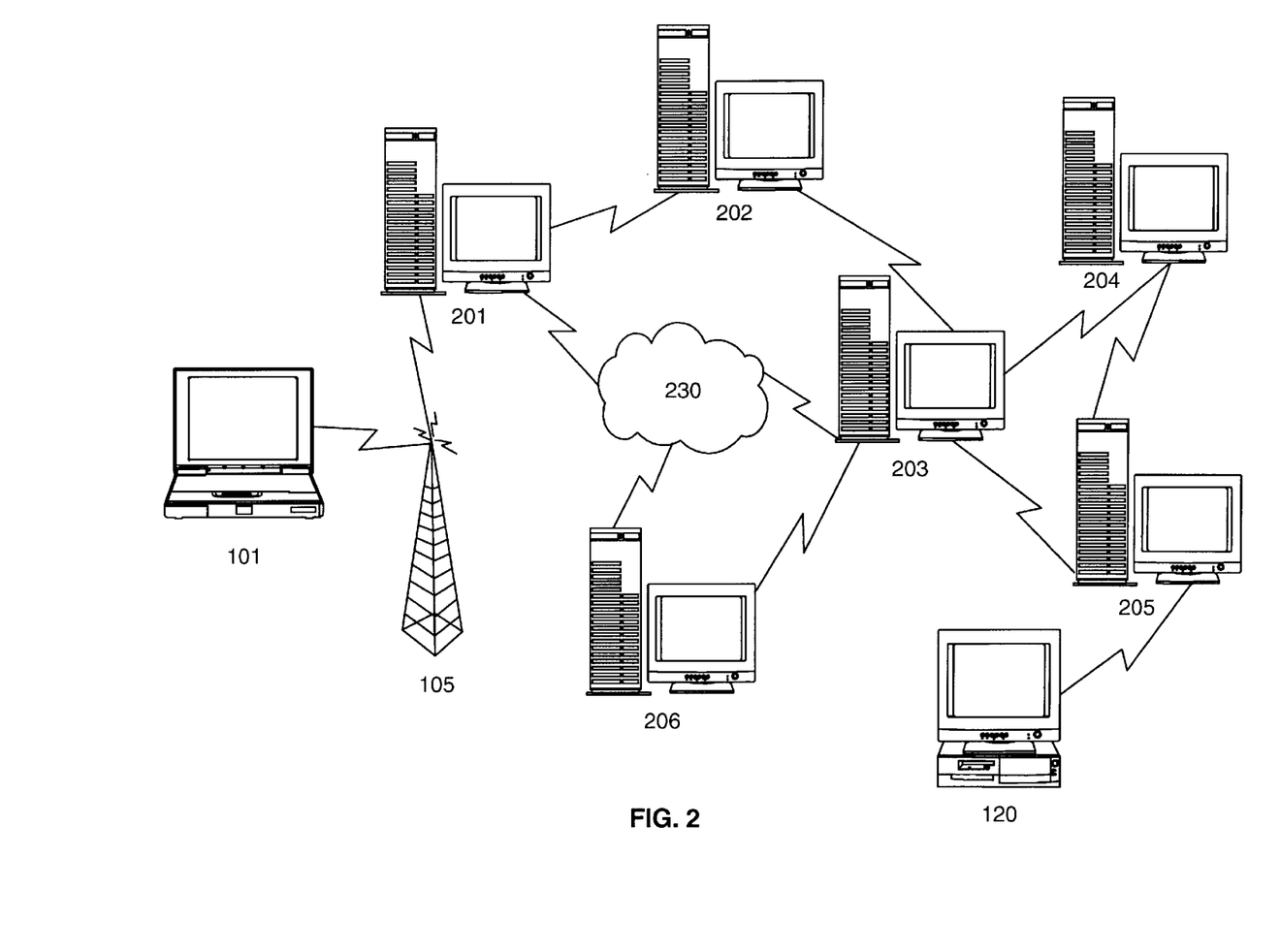
FIG. 2 demonstrates the distribution of multiple parts of a virtual world over multiple physical servers.

FIG. 2 shows a subset of the world wide web and depicts six enumerated servers 201–206. In the present example server 1 (201) contains a hardware store, server 2 (202) contains a woman's clothing store, server 3 (203) contains a drug store, a card shop and a florist, server 4 (204) contains a grocery store and a department store is split between servers 5 (205) and server 6 (206). As is shown by this example, a single store or a single virtual world can reside across multiple servers which may physically reside in multiple locations.

The present invention focuses on the communication between multiple avatars which exist in a virtual world. The communication between the avatars has inherent problems due to the transmission times and latency across multiple links on the Internet and the desire to perceive actions between the avatars as being real-time actions. If an avatar is required to receive instruction for each of its actions from its user, the movements would be extremely jerky due to the delay of transmitting the stimulus from the avatar to the user and awaiting the response from the user. This is demonstrated in the prior art of FIG. 3.

Figure 3:
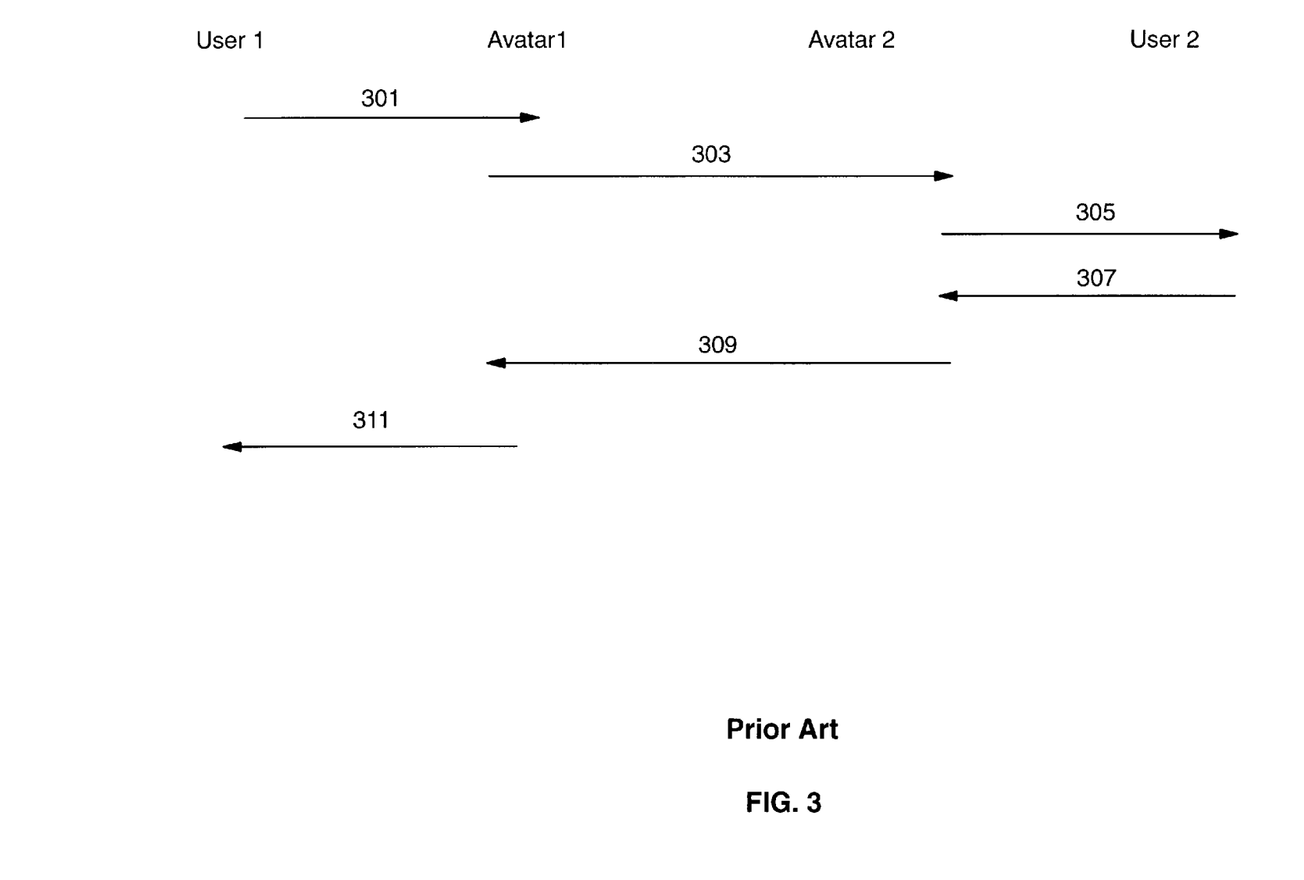
FIG. 3 depicts the prior art flows between two avatars.

FIG. 3 depicts the interaction between two avatars where all of the interaction is controlled directly by the users of the avatars. When AVATAR1 encounters AVATAR2, USER1 instructs AVATAR1 to "say hello to Avatar2" (301). AVATAR1 then transmits to AVATAR2 "hello" (303). AVATAR2 receives the "hello" and transmits this stimulus to its user, USER2 (305). USER2 then instructs AVATAR2 to "say hello to Avatar1" (307). AVATAR2 then transmits to AVATAR1 "hello" (309) and AVATAR1 transmits to USER1 that "Avatar2 said hello" (311). As is demonstrated by this example, even the most trivial and simplistic of interactions involve significant time delay and jerkiness due to the interaction with the controlling users. Introducing the slightest 'physical' interactions between the avatars, such as a handshake, becomes exponentially more cumbersome.

Figure 4:
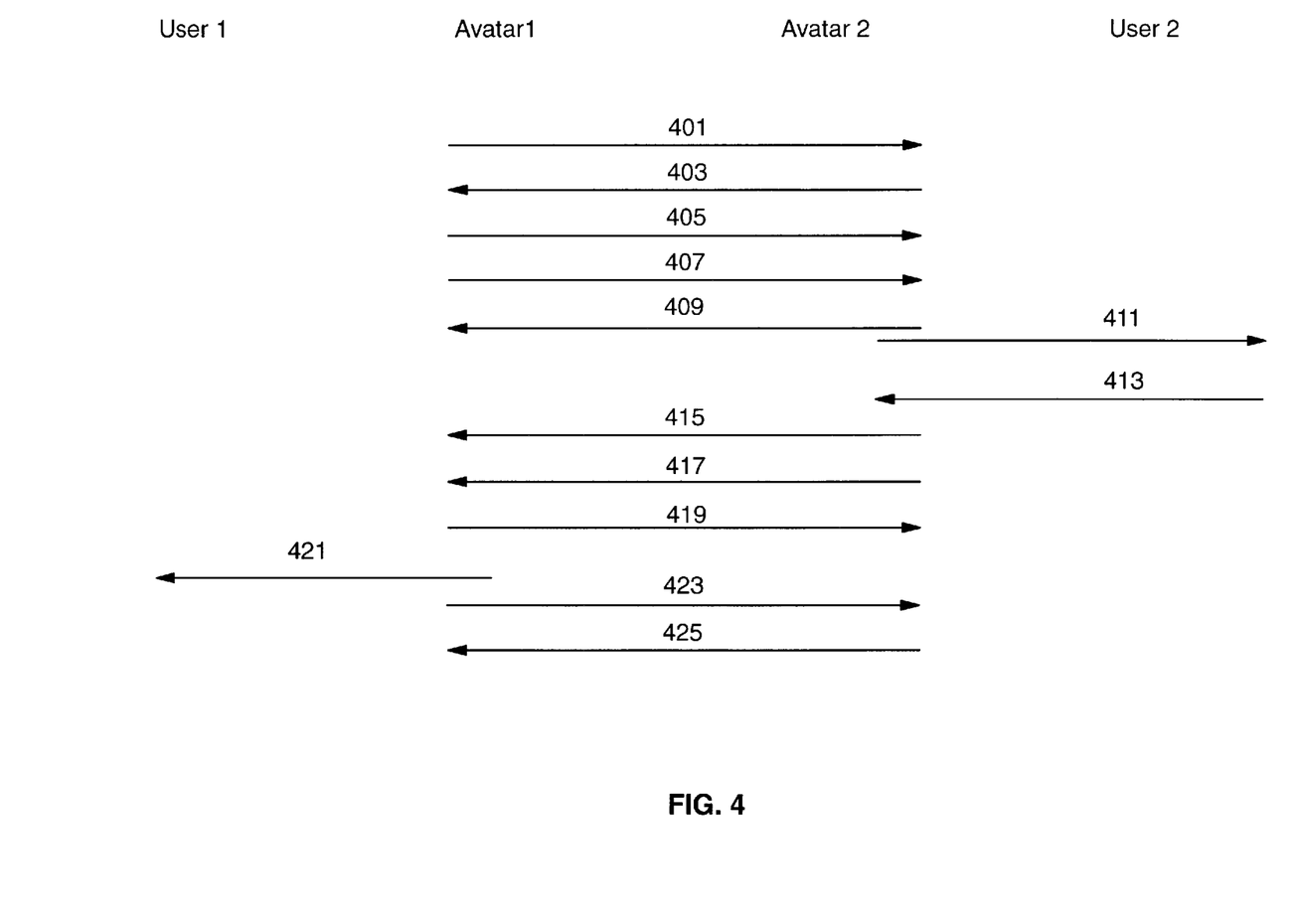
FIG. 4 is an example of the flows between two avatars using the present invention.

The present invention allows the avatar to respond unilaterally to an external stimulus based on its preprogrammed set of responses, also referred to as its personality. These preprogrammed responses may physically reside with the programming of the avatar or may reside on other servers and be referenced by their urn. Lets say that AVATAR1 and AVATAR2 are both given the characteristics of being personable. These characteristics of being personable include, shaking hands when someone extends their hand to you, responding in a similar manner when someone engages in small-talk with you (i.e. say 'hello' or 'good-bye' when another avatar interacts similarly with you), greet all avatars you encounter by saying "hello", or any other characteristics which might be considered as personable. FIG. 4 demonstrates the interaction between AVATAR1 and AVATAR2 in a situation similar to that of FIG. 3, but implementing the present invention.

In FIG. 4, USER1 instructs AVATAR1 to deliver a confidential document, DOC1 to AVATAR2. AVATAR1 then goes out into the virtual world, traversing servers that it is linked to, to find AVATAR2. Lets say that this confidential document is a list of preferences for a birthday gift. As AVATAR1 traverses the virtual world of the shopping mall, he encounters AVATAR2 in the grocery store on server 4 (204). Since AVATAR1 is preprogrammed to find AVATAR2, AVATAR1 says "Hello" (401) to AVATAR2. Since AVATAR2 is preprogrammed to be personable, AVATAR2 says "hello" (403) to AVATAR1 in response. Again, based on the preprogrammed and preselected preferences and instructions, AVATAR1 presents the confidential gift list to AVATAR2 by extending his arm (405) and saying "I have a secret gift list for you" (407). Let us now assume that AVATAR2 is programmed to accept anything 'free' so long as no other conditions apply, but to contact its user if any cost or conditions apply to an offer. Since there is a condition of confidentiality associated with the document which AVATAR1 is attempting to deliver to AVATAR2, AVATAR2 must contact its user, USER2. To reduce the perceived latency in this exchange, AVATAR2 is preprogrammed to look concerned or frown when it is unsure of what response to send, hence AVATAR2 frowns (409) at AVATAR1 and concurrently AVATAR2 sends a message to USER2 saying "Avatar1 wants to give me a confidential gift list" (411). At this point, USER2 does the necessary processing to determine whether he wants to receive this gift list from USER1. In this example, USER2 wants to receive the list since it is the list of birthday presents that his nephew desires. USER2 then instructs AVATAR2 to graciously accept the document (413). AVATAR2 then smiles at AVATAR1 (415), then indicates to AVATAR1 that he will accept the document by saying something like "Thank you, I'll take that" (417). In response, AVATAR1 delivers the secret birthday list to AVATAR2 (419), Informs USER1 that he has delivered the list to USER2 (421) and says "good-bye" (423) to AVATAR2. In response, AVATAR2 says "good-bye" (425) to AVATAR1 and they both continue on their journey through the virtual world.

Figure 5:
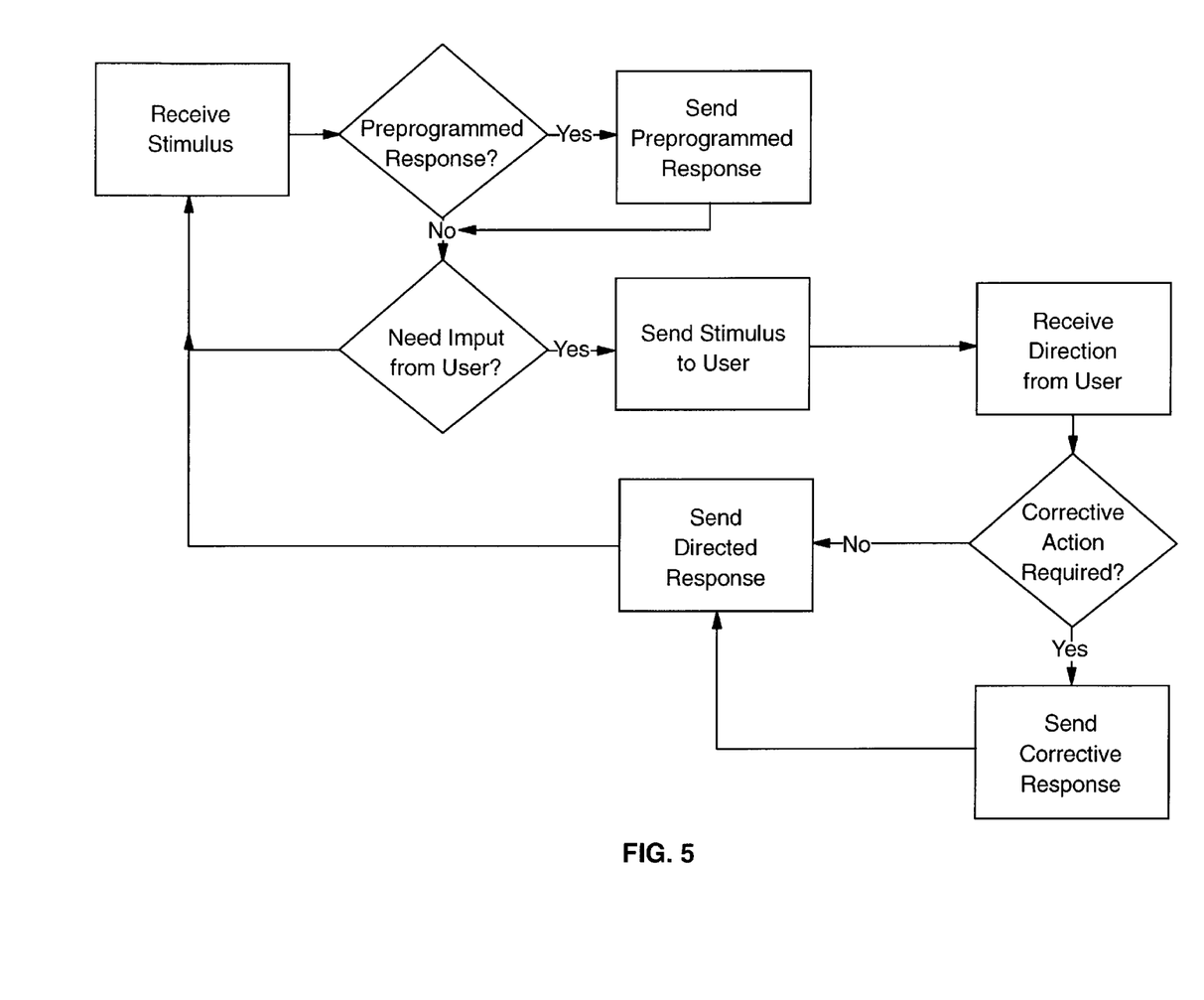
FIG. 5 is a flow chart showing the processing of a response in an avatar of the present invention.

The flow chart of FIG. 5 provides a logical representation of the above flows. First an avatar receives a stimulus (501) from an outside source, say another avatar. The avatar receiving the stimulus first checks to see if there is a preprogrammed response for that stimulus (503), if there is then the avatar issues that preprogrammed response (507). The preprogrammed response could be a final response or a stalling response that is used until a definitive response is received from the user. Then the avatar checks to see if input is needed from the user (505). If no input is needed from the user, then the avatar resumes waiting for an additional stimulus or continues on whatever mission it was directed to perform. If the avatar requires input from the user to complete its action, it sends a record of the stimulus to the user (509) and awaits direction from the user. The avatar next receives direction from the user (511), checks the directed action against the preprogrammed response to determine if corrective action is required (513). If corrective action is required, the avatar sends the corrective action first (515) then, whether corrective action was required or not, the avatar sends the directed response (517), then he waits to receive the next stimulus or continues on with the mission that he was directed to perform.

Taking the example of the birthday list a little further, USER2 can now instruct AVATAR2 to locate the five items on the birthday list, collect the prices of the items (or find the best price) such that they can be delivered to USER2 within 72 hours, then report back to USER2.

AVATAR2 now searches his current server, server 4 (204) for the items listed on the birthday list. Since the current server (204) is a grocery store and the items on the list are toys, AVATAR2 does not find any of the items on the list, therefore he follows a search methodology and goes to an adjacent server that the has not already searched, say server 3 (203). AVATAR2 then searches server 3 (203) which contains a drug Restore, a card shop and a florist. AVATAR2 located two of the five items on the list in the drug store. Since the items were in stock in the drug store and could be delivered within 72 hours, AVATAR2 recorded the price and location of the two items then continued on. The florist in the virtual world carried one of the items on the list but it was on back order and shipment was not expected for three weeks, therefore AVATAR2 did not record that information. AVATAR2 next moved to server 6 (206) which contained the department store. The department store had all five items available and in stock, therefore AVATAR2 recorded the price and location information from server 6 (206). AVATAR2 continued to traverse links from server to server until it exhausted the stores in its virtual world. USER2 could have selected any other arbitrary stopping mechanism for AVATAR2 such as, report back in three hours, report back when you have located each of the items on the list in at least three places, report back after you have searched 50 stores, or any other limiting criteria. For purposes of this invention, the control for terminating the search is irrelevant.

A slight modification to the example above allows the USER2 to direct AVATAR2 to, rather than go collect the pricing and availability information on the five toys, go purchase these five items for the best price available that guarantees delivery within 72 hours. To do this, USER2 must program his credit card number into AVATAR2 and provide a means for AVATAR2 to use the credit card. This involves providing encryption technology, such as cryptolopes, in which the avatar can be given a credit card number and it will remain secure so that only those authorized may access the credit card number.

A more granular description of the behaviors implemented in avatars of the preferred embodiment is the separation of mechanical traits of the avatar from personality traits of the avatar. Both of these traits can be carried with the programming of the avatar or implemented by reference to a url locating the programming or definitions. In implementing the unilateral, or semi-autonomous, actions of the avatar, the mechanical traits are those which the user would perceive as reflexes or uncontrollable reactions, while the personality traits are those which the user would perceive as controllable reactions. Within the controllable reactions, the avatar can be programmed to react to stimulus X one way if in a one-on-one situation, a second way if in a small group situation and a third way if in a large group. This becomes more clear through the following example and as shown by the flow chart of FIG. 6 and the flow diagram of FIG. 7.

Using the example of the virtual shopping mall, lets assume that an avatar enters the virtual department store. Upon entering the department store his presence is detected by the virtual salesperson. This is implemented using VRML sensors. The salesperson is programmed to, upon detecting the entry of a potential customer, to approach the potential customer and collect information. The salesperson avatar will collect the outwardly observable characteristics of the potential customer avatar and pursue a course of action based on the conclusions drawn from the outwardly observable characteristics. In this example, the salesperson detects that the potential customer is an older middle-class male customer. This can be deduced from clothing choice, hair color or any other physical traits. Based on the salesperson avatar's programming, it will approach the potential customer avatar with a predetermined sales pitch for older males. This predetermined sales pitch may consist of mechanical moves and verbal moves. The predetermined sales pitch of the preferred embodiment begins with walking to within three feet of the potential customer, greeting the potential customer with a smile, saying "Hello, may I help you" and extending the hand for a handshake. The avatar could have been programmed, for example, to extend a hand for a handshake to a male but to engage in additional small-talk for a woman rather than extending a hand.

Additional programming of the avatar will allow the avatar to change from one sequence of events to another based on the reactions of the avatar with which they are dealing. For example, the older, middle-class, male avatar might be programmed to be suspicious of close contact, hence he might have a comfort zone of five feet. When the salesperson avatar approaches within 3 feet, the potential customer avatar takes two steps backwards and frowns. In response to this the salesperson avatar could change to a less aggressive sales pitch by smiling and saying "I'll let you browse, please let me know if I can help you in any way", then backing away to a seven foot surveillance distance.

As can be seen from these examples, there are countless possible interactions given the ability to use the VRML programming language and the ability to define the driving stimulus triggering the avatar actions and reactions. A department store could be established to instantiate a salesperson avatar for each potential customer avatar that enters the store. This would allow each potential purchaser to receive undivided attention from a salesperson.

The present invention is not meant to be limited to VRML or to humanoid avatars. The present invention is equally applicable to any virtual world or environment in which intelligent virtual objects can exist.

Figure 6:
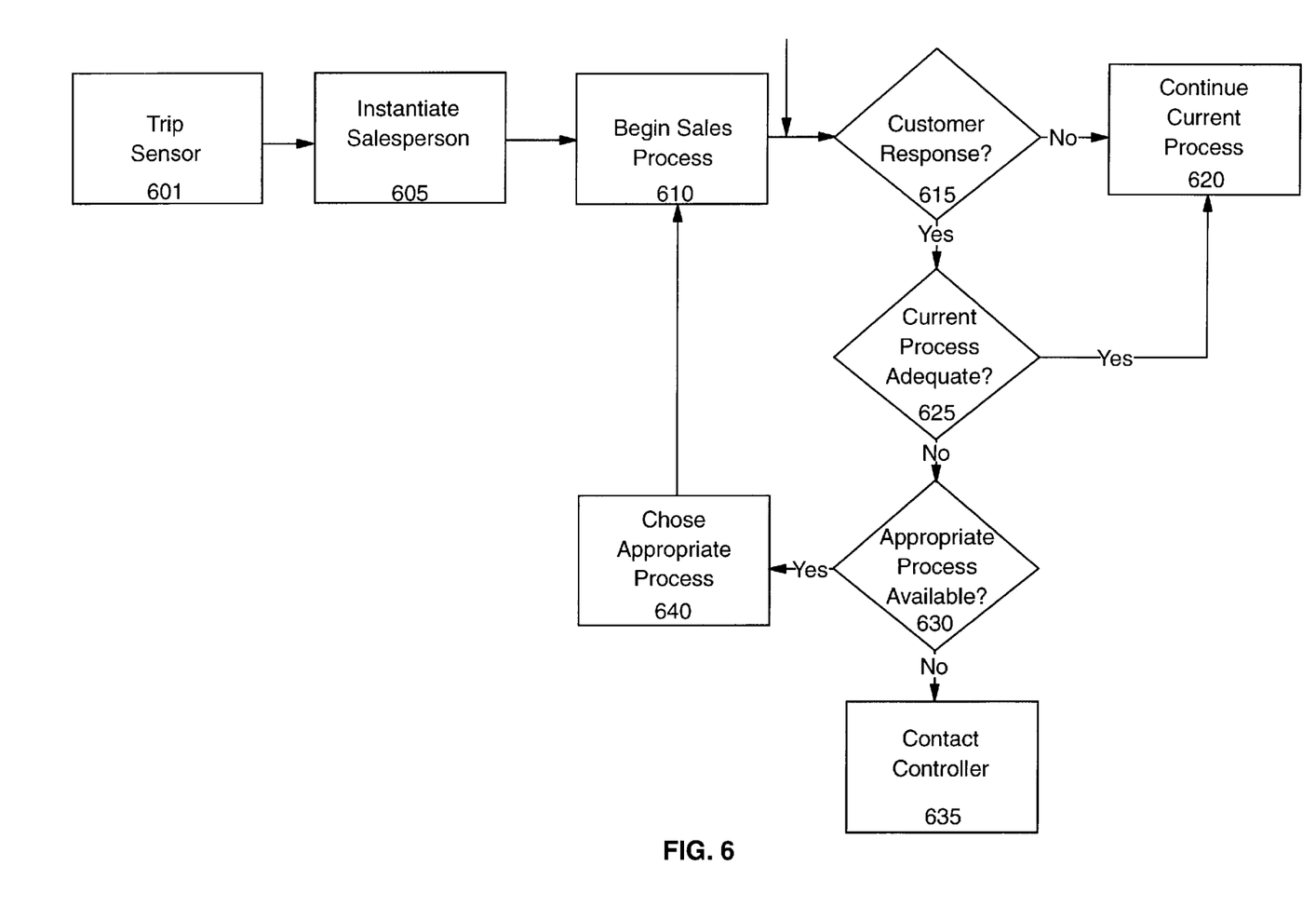
FIG. 6 is a flow chart showing the decision process for an avatar.

FIG. 6 shows a flow chart of the logical interaction between the above mentioned avatars. In the virtual shopping mall of the preferred embodiment, a VRML sensor is tripped (601) when a customer avatar enters a store. The sensor triggers the instantiation of the salesperson avatar (605). Once the salesperson avatar is instantiated he begins his sales program (610). He may first collect information on the customer as input to his sales program, then he begins his interaction with the customer avatar. As the salesperson avatar continues his sales program, he is continuously watching for a reaction or response from the customer avatar (615). If the customer avatar does not respond, the current sales process is continued (620). If the customer does respond, a check is made to see if the response is consistent with the current sales process (625). If it is, the current sales process is continued (620). If the customer response is inconsistent with the current sales process, then a check is made to determine if an appropriate sales process is available (630). If there is no appropriate sales process available, the salesperson avatar contacts his controller or programmer (635). This can be implemented as an alert, an audible message or any other method of notification.

If there is a more appropriate sales process available for the current situation, the salesperson avatar changes to the appropriate process (640) and begins further sales (610) utilizing the programming of the more appropriate process.

Figure 7A:
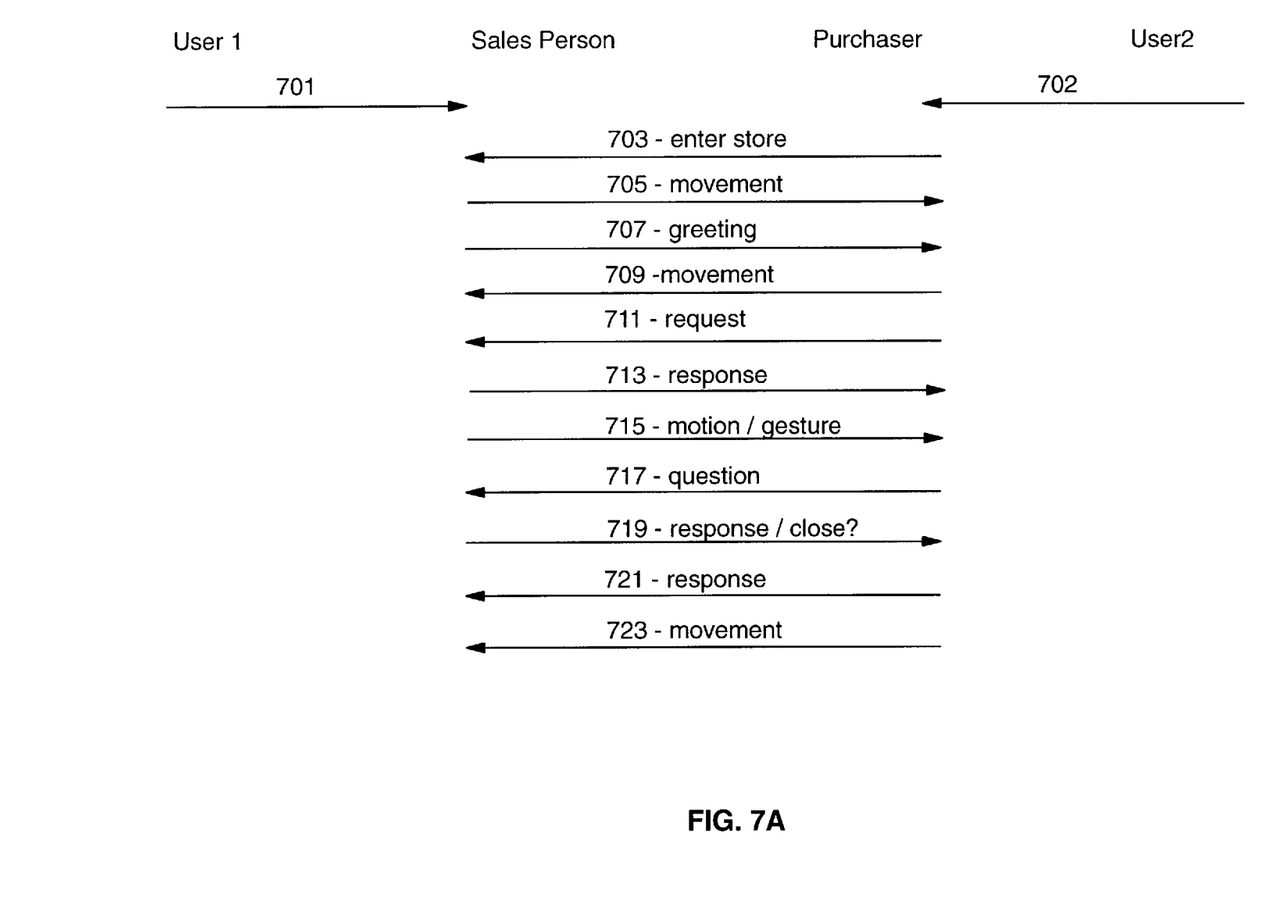
FIGS. 7A and 7B are two examples of the flow of information between avatars.
Figure 7B:
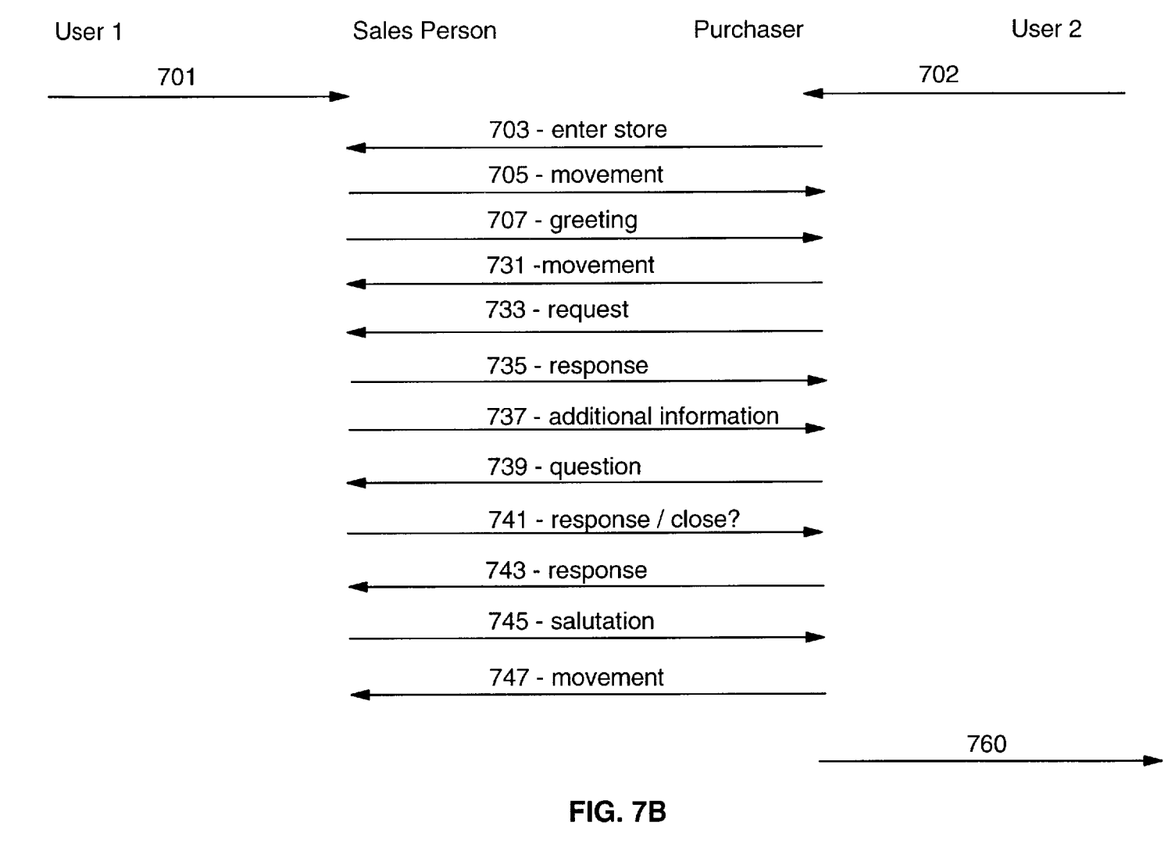

This becomes even clearer through the examples of FIGS. 7A and 7B. FIGS. 7A and 7B show sample information transactions between a salesperson avatar and a potential customer avatar. Prior to any interaction between the two avatars of this example, a user programs the sales pitches into the salesperson avatar (710). In the preferred embodiment, this is done by referring to uris that contain the programming for certain stimuli that the salesperson avatar will receive. These uris contain programs to implement the sales pitches. Also, prior to any interaction between the two avatars, a different user, the user of the potential customer avatar, programs the customer avatar (702) to search the web to find the price of a large, green, plaid, long-sleeve oxford. In our preferred embodiment, the second user (customer) also programs his avatar to have a personality type of slightly aggressive and wants to be in control of the situation.

In the example of FIG. 7A, the customer avatar enters the virtual department store (703) which causes a sensor to trip and the salesperson avatar to be instantiated. The salesperson avatar, following his programming, walks to within four feet of the customer avatar (705), then the salesperson avatar says, "Hello! Can I help you" (707). Since the customer avatar is somewhat aggressive and controlling, the customer avatar steps closer to the salesperson avatar (say, to within three feet) (709) and says, "Yes, do you have any large, green, plaid, long-sleeve oxfords?" (711). The salesperson avatar checks its databases and replies ,"Yes, they are right here" (713). Concurrent with that the salesperson avatar might point (715) to a rack containing the oxfords. The customer avatar, again being a controlling type, asks, "How much are the oxfords?" (717). The salesperson, following his programming for moderately pressured sales replies, "Twenty-five dollars, would you like to purchase one today?" (719) in an attempt to close the sale. The customer avatar, programmed to collect information on the availability and prices of the oxfords replies, "No, thank you" (721) and walks out (723) of the virtual department store. After the transaction is complete, the customer avatar reports the results to its user (730).

In this example, there is no need for either user to intervene in the transaction between the avatars. Everything follows the preprogrammed path. An equally likely scenario, had the customer been preprogrammed to be personable but slightly timid would have been that of FIG. 7B.

In FIG. 7B, the customer walks into the department store (703) tripping the sensor. The salesperson avatar is instantiated and approaches the customer avatar (705), to within his four foot preprogrammed radius, saying, "Hello, may I help you?" (707). The customer avatar, being timid, has a comfort zone of five feet, hence the customer avatar steps back a step (731). This causes the salesperson avatar to change from his "moderately pressured" sales program to his "low pressure" sales program. The customer avatar then says, "Yes, do you have any large, green, plaid, long-sleeve oxfords?" (733). The salesperson checks his database and determines that their are no shirts meeting that requirement in stock and responds to the customer avatar, "No, we have no large, green, plaid, long-sleeve oxfords" (735). The salesperson avatar could then be programmed to do a search for alternative shirts altering one of the criteria and continue his response to the customer by saying," . . . but we have a large, blue, plaid, long-sleeve oxford" (737). The customer avatar could respond "How much are the blue plaid oxfords?" (739). The salesperson avatar responds, "Twenty-five dollars, would you like to purchase one?" (741). In turn, the customer avatar responds, "Not at this time, may be later" (743) to which the salesperson senses the end of the interaction and says "Thank you, Have a nice day" (745) and the customer avatar exits (747) the virtual department store.

As is demonstrated in both FIGS. 7A & 7B, the avatars entered into the virtual department store and collected information, interacted, and represented their users without the requirement of real-time interaction with their users. This could have been altered by unexpected reactions or the need for verification of information. For instance, the customer avatar could have been programmed to purchase the oxford rather than just to collect information on the price. Had this been the case, the salesperson avatar might have been required to validate the credit card number of the customer with its user or with another outside source. In either case, the interaction with the user of the avatar has been significantly reduced and the continuity of interaction with the avatars has been increased.

It should also be noted that multiple consecutive flows in any given direction, as indicated in the figures, could be combined into a single flow to optimize transmission and reduce the flow of header and routing information required. This is also referred to as bundling the transmissions.

What is claimed is:

1. A method in which a user communicates with a first intelligent virtual object, said method comprising the steps of:
   said user selecting a set of characteristics for said first intelligent virtual object wherein each of said characteristics is associated with one or more predetermined responses to stimuli;
   said first intelligent virtual object filtering communication with other intelligent virtual objects utilizing said predetermined responses such that said other intelligent virtual objects receive real-time responses to stimuli initiated by said other intelligent virtual objects; and,
   said first intelligent virtual object interactively passing communication from said other intelligent virtual objects to said user.

2. A method as claimed in claim 1 wherein said characteristics depict the personality of said first intelligent virtual object.

3. A method as claimed in either of claims 1 or 2 comprising the additional steps of:
   said user sending said first intelligent virtual object direction for one or more additional responses if said desired response is inconsistent with said predetermined response or incomplete as to said predetermined response.

4. A method as claimed in either of claims 1 or 2 wherein said first intelligent virtual object reports results from said communication to said user after said communication is complete.

5. A method as claimed in either of claims 1 or 2 wherein said first intelligent virtual object interactively passes communications from said other intelligent virtual objects to said user only when said predetermined response to said stimuli is unknown or indefinite.

6. A method as claimed in claim 5 wherein said communication to said user causes said user to initiate additional action by said first intelligent virtual object.

7. A computer system contained within a computer network wherein multiple computers are connected together using telecommunications mechanisms and in which a user communicates with a first intelligent virtual object, said computer system comprising the steps of:
   said user selecting a set of characteristics for said first intelligent virtual object wherein each of said characteristics is associated with one or more predetermined responses to stimuli;
   said first intelligent virtual object filtering communication with other intelligent virtual objects utilizing said predetermined responses such that said other intelligent virtual objects receive real-time responses to stimuli initiated by said other intelligent virtual objects; and,
   said first intelligent virtual object interactively passing communication from said other intelligent virtual objects to said user.

8. A computer system as claimed in claim 7 wherein said characteristics depict the personality of said first intelligent virtual object.

9. A computer system as claimed in either of claims 7 or 8 comprising the additional steps of:
   said user sending said first intelligent virtual object direction for one or more additional responses if said desired response is inconsistent with said predetermined response or incomplete as to said predetermined response.

10. A computer system as claimed in either of claims 7 or 8 wherein said first intelligent virtual object reports results from said communication to said user after said communication is complete.

11. A computer system as claimed in either of claims 7 or 8 wherein said first intelligent virtual object interactively passes communications from said other intelligent virtual objects to said user only when said predetermined response to said stimuli is unknown or indefinite.

12. A computer system as claimed in claim 11 wherein said communication to said user causes said user to initiate additional action by said first intelligent virtual object.

13. Programmable media containing programmable software enabling a user to communicate with a first intelligent virtual object, programmable software comprising the steps of:
   said user selecting a set of characteristics for said first intelligent virtual object wherein each of said characteristics is associated with one or more predetermined responses to stimuli;
   said first intelligent virtual object filtering communication with other intelligent virtual objects utilizing said predetermined responses such that said other intelligent virtual objects receive real-time responses to stimuli initiated by said other intelligent virtual objects; and,
   said first intelligent virtual object interactively passing communication from other intelligent virtual objects to said user.

14. Programmable media as claimed in claim 13 wherein said characteristics depict the personality of said first intelligent virtual object.

15. Programmable media as claimed in either of claims 13 or 14 comprising the additional steps of:

said user sending said first intelligent virtual object direction for one or more additional responses if said desired response is inconsistent with said predetermined response or incomplete as to said predetermined response.

16. Programmable media as claimed in either of claims 13 or 14 wherein said first intelligent virtual object reports results from said communication to said user after said communication is complete.

17. A programmable media as claimed in either of claims 13 or 14 wherein said first intelligent virtual object interactively passes communications from said other intelligent virtual objects to said user only when said predetermined response to said stimuli is unknown or indefinite.

18. A programmable media as claimed in claim 17 wherein said communication to said user causes said user to initiate additional action by said first intelligent virtual object.

* * * * *